(12) United States Patent
Lin et al.

(10) Patent No.: US 12,450,281 B2
(45) Date of Patent: Oct. 21, 2025

(54) SEARCH REQUEST PROCESSING METHOD AND APPARATUS, COMPUTER DEVICE, AND STORAGE MEDIUM

(71) Applicant: Beijing Bytedance Network Technology Co., Ltd., Beijing (CN)

(72) Inventors: Yating Lin, Beijing (CN); Yujie Wu, Beijing (CN); Mulan Hou, Beijing (CN); Xiaokun Jiang, Beijing (CN); Pengshuai Li, Beijing (CN); Zijian Zhang, Beijing (CN); Chaoyang Wang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/524,766

(22) Filed: Nov. 30, 2023

(65) Prior Publication Data

US 2024/0095272 A1     Mar. 21, 2024

Related U.S. Application Data

(63) Continuation of application No. PCT/CN2022/136327, filed on Dec. 2, 2022.

(30) Foreign Application Priority Data

Jan. 12, 2022   (CN) .......................... 202210033811.6

(51) Int. Cl.
   *G06F 16/00*     (2019.01)
   *G06F 16/435*    (2019.01)
   (Continued)

(52) U.S. Cl.
   CPC ........ *G06F 16/4393* (2019.01); *G06F 16/435* (2019.01); *G06F 16/45* (2019.01)

(58) Field of Classification Search
   CPC ..... G06F 16/4393; G06F 16/435; G06F 16/45
   See application file for complete search history.

(56) References Cited

U.S. PATENT DOCUMENTS

| | | | |
|---|---|---|---|
| 2015/0161212 A1* | 6/2015 | Yang | G06F 16/9535 707/722 |
| 2019/0370305 A1* | 12/2019 | Liu | G06F 16/3329 |
| 2021/0271701 A1* | 9/2021 | Zhiwen | G06F 16/45 |

FOREIGN PATENT DOCUMENTS

| | | |
|---|---|---|
| CN | 104636465 A | 5/2015 |
| CN | 111310078 A | 6/2020 |

(Continued)

OTHER PUBLICATIONS

China National Intellectual Property Administration, Notice of Allowance Issued in Application No. 202210033811.6, Apr. 29, 2023, 11 pages.

(Continued)

*Primary Examiner* — Paul Kim
(74) *Attorney, Agent, or Firm* — Alleman Hall & Tuttle LLP

(57) ABSTRACT

Provided are a search request processing method, an apparatus, a computer device, a storage medium, a computer product, and a computer program. The method includes: in response to a search instruction, sending a search request comprising a target question; acquiring a plurality of sets of answer information corresponding to the target question, wherein each set of answer information includes answer summary information and a multimedia content supporting the answer summary information; the genre of the multimedia content is determined on the basis of a category of the target question, and the answer summary information is extracted on the basis of the multimedia content; and displaying the answer summary information in each set of answer information on a search result page, and displaying, (Continued)

when any piece of answer summary information is selected, at least part of the multimedia content supporting the selected answer summary information.

17 Claims, 7 Drawing Sheets

(51) Int. Cl.
*G06F 16/438* (2019.01)
*G06F 16/45* (2019.01)

(56) References Cited

FOREIGN PATENT DOCUMENTS

| | | |
|---|---|---|
| CN | 111611492 A | 9/2020 |
| CN | 112084268 A | 12/2020 |
| CN | 112115282 A | 12/2020 |
| CN | 113392308 A | 9/2021 |
| CN | 113779307 A | 12/2021 |
| CN | 114372160 A | 4/2022 |
| WO | 2015196910 A1 | 12/2015 |
| WO | 2016095562 A1 | 6/2016 |

OTHER PUBLICATIONS

ISA China National Intellectual Property Administration, International Search Report and Written Opinion Issued in Application No. PCT/CN2022/136327, Feb. 15, 2023, WIPO, 8 pages.

\* cited by examiner

SEARCH REQUEST PROCESSING METHOD AND APPARATUS, COMPUTER DEVICE, AND STORAGE MEDIUM

CROSS-REFERENCE TO RELATED APPLICATIONS

This application is a Continuation Applications of International Patent Application No. PCT/CN2022/136327, filed Dec. 2, 2022, which claims priority to Chinese Patent Application No. 202210033811.6, entitled "SEARCH REQUEST PROCESSING METHOD AND APPARATUS, COMPUTER DEVICE, AND STORAGE MEDIUM", filed with the China National Intellectual Property Administration on Jan. 12, 2022, the disclosures of which are incorporated herein by reference in their entireties.

FIELD

The present disclosure relates to the technical field of computers, and in particular, to a search request processing method and apparatus, a computer device, a storage medium, a computer program, and a computer program.

BACKGROUND

When a user performs problem query, corresponding search results are usually sequenced according to a quantity of viewers, degrees of association with a search term, and the like. If a question corresponds to a plurality of answers, each search result can only present one or several answers. If the user wants to view all the answers, the user can only click on the search results one by one to view the answers, and the entire operation process of obtaining the search results is relatively cumbersome.

SUMMARY

Embodiments of the present disclosure at least provide a search request processing method and apparatus, a computer device, a storage medium, a computer product, and a computer program.

In a first aspect, the embodiments of the present disclosure provide a search request processing method, including:
  in response to a search instruction, sending a search request including a target question;
  acquiring a plurality of sets of answer information corresponding to the target question, wherein each set of answer information includes answer summary information and a multimedia content supporting the answer summary information; a genre of the multimedia content is determined on the basis of a category of the target question, and the answer summary information is extracted on the basis of the multimedia content; and
  displaying the answer summary information in each set of answer information on a search result page, and displaying, when any piece of answer summary information is selected, at least part of the multimedia content supporting the selected answer summary information.

In a possible implementation, the category of the target question is determined through a sentence pattern of the target question or a pre-trained category determining model.

In a possible implementation, the displaying the answer summary information in each set of answer information on a search result page, and displaying, when any piece of answer summary information is selected, at least part of the multimedia content supporting the selected answer summary information includes:
  displaying the answer summary information in the respective sets of answer information at a first preset position of the search result page;
  in response to a selection operation on target answer summary information, displaying associated information supporting the target answer summary information at a second preset position of the search result page, wherein the associated information includes an argument and/or a premise; an inner link is added in the associated information; the inner link points to the multimedia content corresponding to the target answer summary information; and
  in response to a triggering operation on target associated information, displaying preview information of the multimedia content corresponding to the target answer summary information.

In a possible implementation, the displaying the answer summary information in each set of answer information on a search result page, and displaying, when any piece of answer summary information is selected, at least part of the multimedia content supporting the selected answer summary information includes:
  displaying the answer summary information in the respective sets of answer information at a third preset position of the search result page;
  in response to a selection operation on target answer summary information, displaying corresponding associated information supporting the target answer summary information at a fourth preset position, wherein the associated information includes an argument and/or a premise; and
  displaying at least one multimedia card corresponding to the target answer summary information at a fifth preset position, wherein the multimedia card displays preview information of the multimedia content supporting the target answer summary information, and the preview information includes the target answer summary information,
  wherein the at least one multimedia card supports slide displaying.

In a possible implementation, the displaying the answer summary information in each set of answer information on a search result page, and displaying, when any piece of answer summary information is selected, at least part of the multimedia content supporting the selected answer summary information includes:
  displaying, at a sixth preset position of the search result page, answer summary information including the respective pieces of answer summary information in the plurality of sets of answer information; and
  displaying the answer summary information in the respective sets of answer information at a seventh preset position of the search result page, and displaying at least part of the multimedia content of the selected answer summary information at an eighth preset position, wherein the at least part of the multimedia content includes the selected answer summary information.

In a possible implementation, the displaying the answer summary information in each set of answer information on a search result page, and displaying, when any piece of answer summary information is selected, at least part of the multimedia content supporting the selected answer summary information includes:

displaying, at the search result page, answer cards respectively corresponding to the respective sets of answer information, wherein the answer cards display the answer summary information in the answer information and associated information in the answer information, and the associated information includes an argument and/or a premise; and in response to a triggering operation on a target answer card, displaying, at a corresponding position of the target answer card, at least part of the multimedia content of the answer information corresponding to the target answer card.

In a possible implementation, the genre of the multimedia content includes at least one of the following:

image, text, video, and audio; and the genre of the multimedia content is determined on the basis of a correspondence relationship between the category of the question and the genre of the multimedia after the category of the target question is determined.

In a possible implementation, the method further includes:

displaying search result identifiers at corresponding positions of the respective pieces of answer summary information; and in response to a selection operation on the search result identifier corresponding to any piece of answer summary information, displaying preview information of a plurality of search results corresponding to the selected answer summary information.

In a second aspect, the embodiments of the present disclosure provide a search request processing apparatus, including:

a sending module, configured to: in response to a search instruction, send a search request including a target question;

an acquisition module, configured to acquire a plurality of sets of answer information corresponding to the target question, wherein each set of answer information includes answer summary information and a multimedia content supporting the answer summary information; a genre of the multimedia content is determined on the basis of a category of the target question, and the answer summary information is extracted on the basis of the multimedia content; and a displaying module, configured to: display the answer summary information in each set of answer information on a search result page, and display, when any piece of answer summary information is selected, at least part of the multimedia content supporting the selected answer summary information.

In a possible implementation, the category of the target question is determined through a sentence pattern of the target question or a pre-trained category determining model.

In a possible implementation, when displaying the answer summary information in each set of answer information on a search result page, and displaying, when any piece of answer summary information is selected, at least part of the multimedia content supporting the selected answer summary information, the displaying module is configured to:

display the answer summary information in the respective sets of answer information at a first preset position of the search result page;

in response to a selection operation on target answer summary information, display associated information supporting the target answer summary information at a second preset position of the search result page, wherein the associated information includes an argument and/or a premise; an inner link is added in the associated information; the inner link points to the multimedia content corresponding to the target answer summary information; and in response to a triggering operation on target associated information, display preview information of the multimedia content corresponding to the target answer summary information.

In a possible implementation, when displaying the answer summary information in each set of answer information on a search result page, and displaying, when any piece of answer summary information is selected, at least part of the multimedia content supporting the selected answer summary information, the displaying module is configured to:

display the answer summary information in the respective sets of answer information at a third preset position of the search result page;

in response to a selection operation on target answer summary information, display corresponding associated information supporting the target answer summary information at a fourth preset position, wherein the associated information includes an argument and/or a premise; and display at least one multimedia card corresponding to the target answer summary information at a fifth preset position, wherein the multimedia card displays preview information of the multimedia content supporting the target answer summary information, and the preview information includes the target answer summary information, wherein the at least one multimedia card supports slide displaying.

In a possible implementation, when displaying the answer summary information in each set of answer information on a search result page, and displaying, when any piece of answer summary information is selected, at least part of the multimedia content supporting the selected answer summary information, the displaying module is configured to:

display, at a sixth preset position of the search result page, answer summary information including the respective pieces of answer summary information in the plurality of sets of answer information; and display the answer summary information in the respective sets of answer information at a seventh preset position of the search result page, and display at least part of the multimedia content of the selected answer summary information at an eighth preset position, wherein the at least part of the multimedia content includes the selected answer summary information.

In a possible implementation, when displaying the answer summary information in each set of answer information on a search result page, and displaying, when any piece of answer summary information is selected, at least part of the multimedia content supporting the selected answer summary information, the displaying module is configured to:

display, at the search result page, answer cards respectively corresponding to the respective sets of answer information, wherein the answer cards display the answer summary information in the answer information and associated information in the answer information, and the associated information includes an argument and/or a premise; and in response to a triggering operation on a target answer card, display, at a corresponding position of the target answer card, at least part of the multimedia content of the answer information corresponding to the target answer card.

In a possible implementation, the genre of the multimedia content includes at least one of the following:
image, text, video, and audio; and
the genre of the multimedia content is determined on the basis of a correspondence relationship between the category of the question and the genre of the multimedia after the category of the target question is determined.

In a possible implementation, the displaying module is further configured to:
display search result identifiers at corresponding positions of the respective pieces of answer summary information; and
in response to a selection operation on the search result identifier corresponding to any piece of answer summary information, display preview information of a plurality of search results corresponding to the selected answer summary information.

In a third aspect, the embodiments of the present disclosure further provide a computer device, including a processor, a memory, and a bus, wherein the memory stores machine-readable instructions executable by the processor; when the computer device is run, the processor communicates with the memory through the bus; and the machine-readable instructions, when executed by the processor, perform the first aspect or the steps of any possible implementation in the first aspect.

In a fourth aspect, the embodiments of the present disclosure further provide a computer-readable storage medium, wherein the computer-readable storage medium stores a computer program, and the computer program, when executed by a processor, performs the first aspect or the steps of any possible implementation in the first aspect.

In a fifth aspect, the embodiments of the present disclosure further provide a computer product, wherein the computer product includes computer instructions. The computer instructions, when executed by a processor, implement the first aspect or the steps of any possible implementation in the first aspect.

In a sixth aspect, the embodiments of the present disclosure further provide a computer program, wherein the computer program, when executed by a processor, implements the first aspect or the steps of any possible implementation in the first aspect.

The search request processing method and apparatus, the computer device, the storage medium, the computer product, and the computer program according to the embodiments of the present disclosure can include: in response to a search instruction, sending a search request including a target question; then, acquiring a plurality of sets of answer information corresponding to the target question; and finally, displaying the answer summary information in each set of answer information on a search result page, and displaying, when any piece of answer summary information is selected, at least part of the multimedia content supporting the selected answer summary information. By use of the method, a variety of pieces of different answer summary information extracted from the answer information can be displayed to a user, thereby intuitively displaying core contents of various answers to the user and displaying the preview information of the multimedia content corresponding to the answer summary information. This facilitates the user to quickly understand contents in search results and saves the search time of the user.

In order to make the above objectives, features, and advantages of the present disclosure more apparent and understandable, the following text provides preferred embodiments. A detailed explanation is made below in conjunction with the accompanying drawings.

BRIEF DESCRIPTION OF THE DRAWINGS

In order to explain the technical solutions of the embodiments of the present disclosure more clearly, the drawings required to be used in the embodiments are briefly introduced below. The drawings here are incorporated into and form part of this specification. These drawings show the embodiments that comply with the present disclosure, and are used together with this specification to explain the technical solutions of the present disclosure. It should be understood that the accompanying drawings below only show some embodiments of the present disclosure. Therefore, the embodiments shall not be regarded as limitations on the scope. A person of ordinary skill in the art can also derive other relevant drawings according to these drawings without creative work.

DETAILED DESCRIPTION OF EMBODIMENTS

Figure 1:
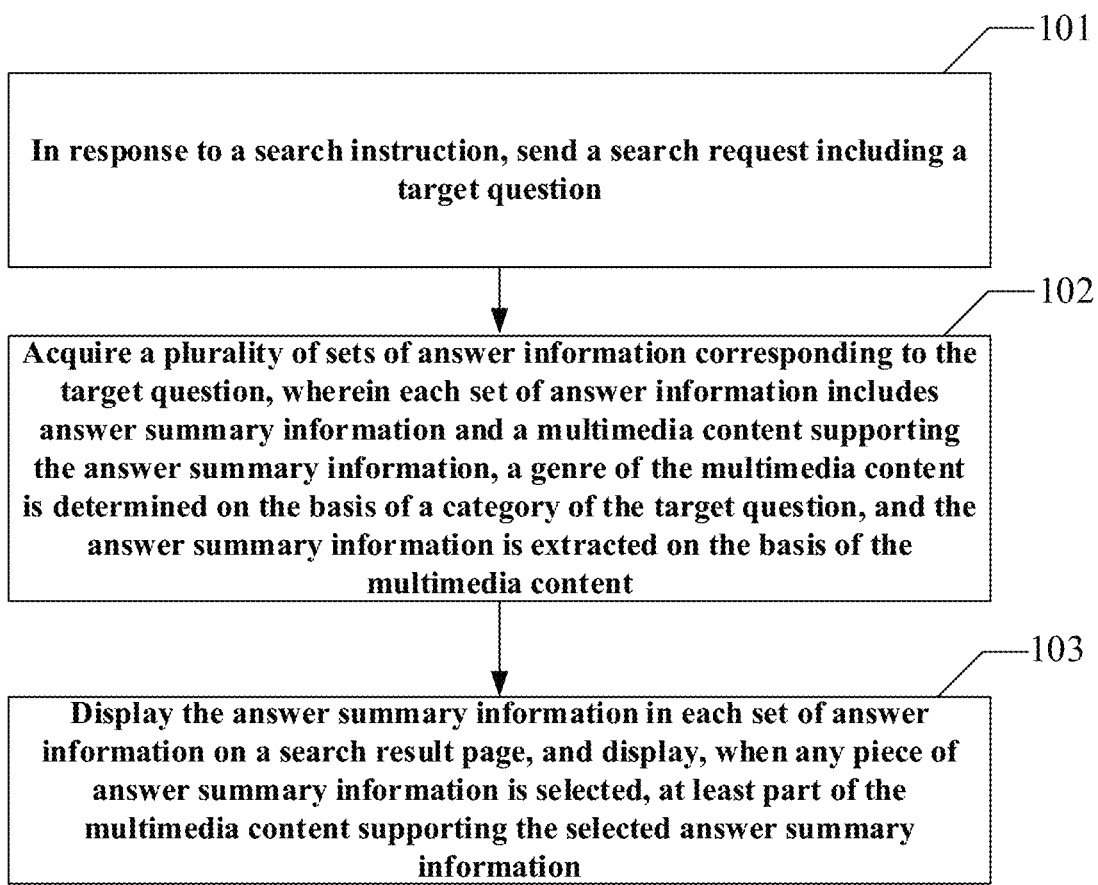
FIG. 1 shows a flowchart of a search request processing method according to an embodiment of the present disclosure.

In order to make the objectives, technical solutions, and advantages of the embodiments of the present disclosure clearer, the technical solutions in the embodiments of the present disclosure are clearly described below with reference to the accompanying drawings in the embodiments of the present disclosure. Apparently, the described embodiments are merely some rather than all of the embodiments of the present disclosure. Assemblies of the embodiments of the present disclosure commonly described and shown in the accompanying drawings here may be arranged and designed in a variety of different configurations. Therefore, the following detailed descriptions of the embodiments of the present disclosure provided in the accompanying drawings are not intended to limit the scope of the claimed present disclosure, but merely represents selected embodiments of the present disclosure. All other embodiments obtained by a person skilled in the art based on the embodiments of the present disclosure without making creative efforts shall fall within the protection scope of the present disclosure.

When a user performs problem query, corresponding search results are usually sequenced according to a quantity of viewers, degrees of association with a search term, and the like. If a question corresponds to a plurality of answers, each search result can only present one or several answers. If the user wants to view all the answers, the user can only click on the search results one by one to view the answers, and the entire operation process of obtaining the search results is relatively cumbersome.

Based on the research described above, the present disclosure provides a search request processing method and apparatus, a computer device, a storage medium, a computer product, and a computer program, which can: in response to a search instruction, send a search request including a target question; then, acquire a plurality of sets of answer information corresponding to the target question; and finally, display the answer summary information in each set of answer information on a search result page, and display, when any piece of answer summary information is selected, at least part of the multimedia content supporting the selected answer summary information. By use of the method, a variety of pieces of different answer summary information extracted from the answer information can be displayed to a user, thereby intuitively displaying core contents of various answers to the user and displaying the preview information of the multimedia content corresponding to the answer summary information. This facilitates the user to quickly understand contents in search results and saves the search time of the user.

It should be noted that similar reference numerals and letters indicate similar items in the following drawings. Therefore, once a certain item is defined in one drawing, it is unnecessary to further define and explain it in the subsequent drawings.

The term "and/or" herein only describes an association relationship, representing that three relationships may exist. For example, A and/or B may represent three situations: A exists alone; A and B exist simultaneously; and B exists alone. In addition, the term "at least one" herein refers to any one or any combination of at least two of a variety, for example, including at least one of A, B, and C, which can represent any one or more elements selected from a set composed of A, B, and C.

In order to facilitate the understanding of this embodiment, a search request processing method disclosed in the embodiments of the present disclosure is first introduced in detail. An executive body of the search request processing method provided by the embodiments of the present disclosure is generally a terminal device. The terminal device can refer to a smartphone, a tablet, a personal computer, and the like.

FIG. 1 shows a flowchart of a search request processing method according to an embodiment of the present disclosure. The method includes step 101 to step 103.

Step 101. In response to a search instruction, a search request including a target question is sent.

Step 102. A plurality of sets of answer information corresponding to the target question are acquired, wherein each set of answer information includes answer summary information and a multimedia content supporting the answer summary information; a genre of the multimedia content is determined on the basis of a category of the target question, and the answer summary information is extracted on the basis of the multimedia content.

Step 103. The answer summary information in each set of answer information is displayed on a search result page, and at least part of the multimedia content supporting the selected answer summary information is displayed when any piece of answer summary information is selected.

The following is a detailed explanation of the above steps.

For step 101:

In a possible implementation, a search page that includes an input box and a search identifier can be displayed at a user side. The input box can receive the target question input by a user, and the search identifier can generate the search instruction in response to a triggering operation of the user. The triggering operation includes but is not limited to single click, double click, long press, sliding, and dragging.

In another possible implementation, the user side can determine the target question in response to voice information before responding to the search instruction. For example, when the user says "Search what are the benefits of eating hawthorn", the user side can recognize the voice of the user, generate corresponding text information, identify the target question in the text information, and then generate the search instruction.

Further, after receiving the search instruction, the user side can generate, on the basis of the target question input by the user, a search request including the target question and send the search request to a server. After receiving the search request, the server can determine a plurality of sets of answer information corresponding to the target question and send the plurality of sets of answer information to the user side.

For step 102:

In a possible implementation, the genre of the multimedia content includes at least one of the following: image, text, video, and audio. The genre of the multimedia content is determined on the basis of a correspondence relationship between the category of the question and the genre of the multimedia after the category of the target question is determined.

The category of the target question can exemplarily include a cause category, a definition category, an implementation category, a digit category, a determining category, and the like, specifically as follows:

(1) The target question of the cause category can be a question about a scientific principle and an objective fact, for example "What is the cause of frequent urination".

(2) The target question of the definition category can be a question about the concept and meaning of a certain object, for example "What is Alzheimer".

(3) The target question of the implementation category can be a question about an operation step and an implementation method, for example "Ways to cancel mobile phone numbers".

(4) An answer corresponding to the target question of the digit category is a digit, such as "10 min" and "800 m". An example of the target question of the digit category can be "How long does it take to cook Zongzi".

(5) There are only two answers corresponding to the target question of the determining category, such as "Yes" or "No", "can" or "can't". An example of the target question of the determining category can be "can a person suffering from gastric ulcer eat bread".

The category of the target question can be determined on the server. In a possible implementation, the category of the target question is determined through a sentence pattern of the target question or a pre-trained category determining model.

Specifically, when the category of the target question is determined through the pre-trained category determining model, the category determining model can first perform word segmentation processing on the target question, and then perform semantic analysis on the meaning of each word and relationships between the respective words to determine the category of the target question.

Or, when the category of the target question is determined through the sentence pattern of the target question, a sentence pattern keyword in the target question is detected on the basis of a preset sentence pattern word library, and relationships between the sentence pattern keyword and words before and after the sentence pattern keyword, thereby determining a target sentence pattern of the target question; and the category of the target question is then determined on the basis of a preset second correspondence relationship between the target sentence pattern and the category of the target question.

Exemplary, if the sentence pattern of the target question is "why . . . ", "what is the reason for . . . ", and the like, the target question can be determined to be the cause category. If the sentence pattern of the target question is " . . . means . . . ", "what is . . . ", and the like, the target question can be determined to be the definition category. If the sentence pattern of the target question is "how . . . ", "ways to . . . ", and the like, the target question can be determined to be the implementation category. If the sentence pattern of the target question is "how many . . . ", "how long does it take to . . . ", and the like, the target question can be determined to be a digit category. If the sentence pattern of the target question is "may/can . . . ?", and the like, the target question can be determined to be a determining category.

In a possible implementation, the genre of the multimedia content can be determined on the basis of a preset first correspondence relationship between the category of the target question and the genre of the multimedia content after the category of the target question is determined.

Exemplarily, the first correspondence relationship can be as follows: Genres corresponding to target questions of the cause category and the implementation category are video and audio multimedia contents, and genres corresponding to target questions of the definition category, the digit category, and the determining category are image and text multimedia contents.

After the genre of the multimedia content is determined, the server can only acquire the multimedia content of the genre when acquiring the plurality of sets of answer information corresponding to the target question, and then the server can extract and determine the answer summary information from the acquired multimedia content.

In a possible implementation, when the answer summary information is extracted from the multimedia content, different extraction manners can be adopted for different genres of multimedia contents, specifically as follows:

(1) If the genre of the multimedia content is text, semantic analysis can be performed on the multimedia content on the basis of a pre-trained answer extraction model to determine the answer summary information.

(2) If the genre of the multimedia content is image, image recognition can be performed on the multimedia content to determine objects (including an entity and an event) included in the multimedia content, and/or text recognition can be performed on the multimedia content to determine a text included in the multimedia content, semantic analysis is performed on the text, and the answer summary information is determined on the basis of the objects and/or a semantic analysis result.

(3) If the genre of the multimedia content is video, image recognition and/or text recognition can be performed on a plurality of video frames of the multimedia content. The image recognition and semantic analysis manners are the same as those in (2) described above, and will not be repeatedly described here.

(4) If the genre of the multimedia content is audio, voice recognition can be performed on the multimedia content first; the audio is converted into a text; semantic analysis is then performed on the text. The semantic analysis manner is the same as that in (2) described above, and will not be repeatedly described here.

It should be noted that the acquired multimedia content can include one or more of the genres mentioned above. During extraction of answer summary information from different genres of multimedia contents, extraction methods corresponding to the genres of the parts of the multimedia contents can be selected for parts of multimedia contents of different genres.

In a possible implementation, for a plurality of multimedia contents in the plurality of sets of answer information, a plurality of pieces of answer summary information are extracted. After the plurality of pieces of answer summary information are acquired, content classification can be performed on the plurality of pieces of answer summary information, and a plurality of pieces of candidate answer summary information after content classification can be sequenced according to appearing frequencies, and candidate answer summary information with the highest appearing frequency is selected as first target answer summary information.

In another possible implementation, before the answer summary information is extracted, acquisition sources of the multimedia content can be sequenced according to authorities, and the answer summary information is extracted from the multimedia contents in a preset number of acquisition sources with the highest authorities; the content classification is performed on the plurality of pieces of extracted answer summary information; and the answer summary information after content classification is determined to be second target answer summary information.

In the two manners described above, the content classification is used for combining answer summary information with the same meanings. The content classification can exemplarily include combination of synonyms, combination of digits, and the like.

After the target answer summary information is determined, the target answer summary information can be used as the answer summary information in step 103, and step 103 is executed.

By use of the above method, the genre of the multimedia content is determined on the basis of the category of the target question. Multimedia contents of appropriate genres can be selected for different categories of target questions, thereby displaying the plurality of sets of answer information corresponding to the target question are displayed to the user more clearly. Extracting the answer summary information from the multimedia content can accurately extract a core idea of the multimedia content and display the core idea to the user, so that the user obtain answers corresponding to the target question more intuitively, clearly, and quickly.

For step 103:

At least part of the multimedia content that supports the selected answer summary information can be the multimedia content, or can be preview information of the multimedia content, or can be part of the multimedia content determined on the basis of a size of a displaying region, such as the first 50 characters of the multimedia content.

Figure 2A:
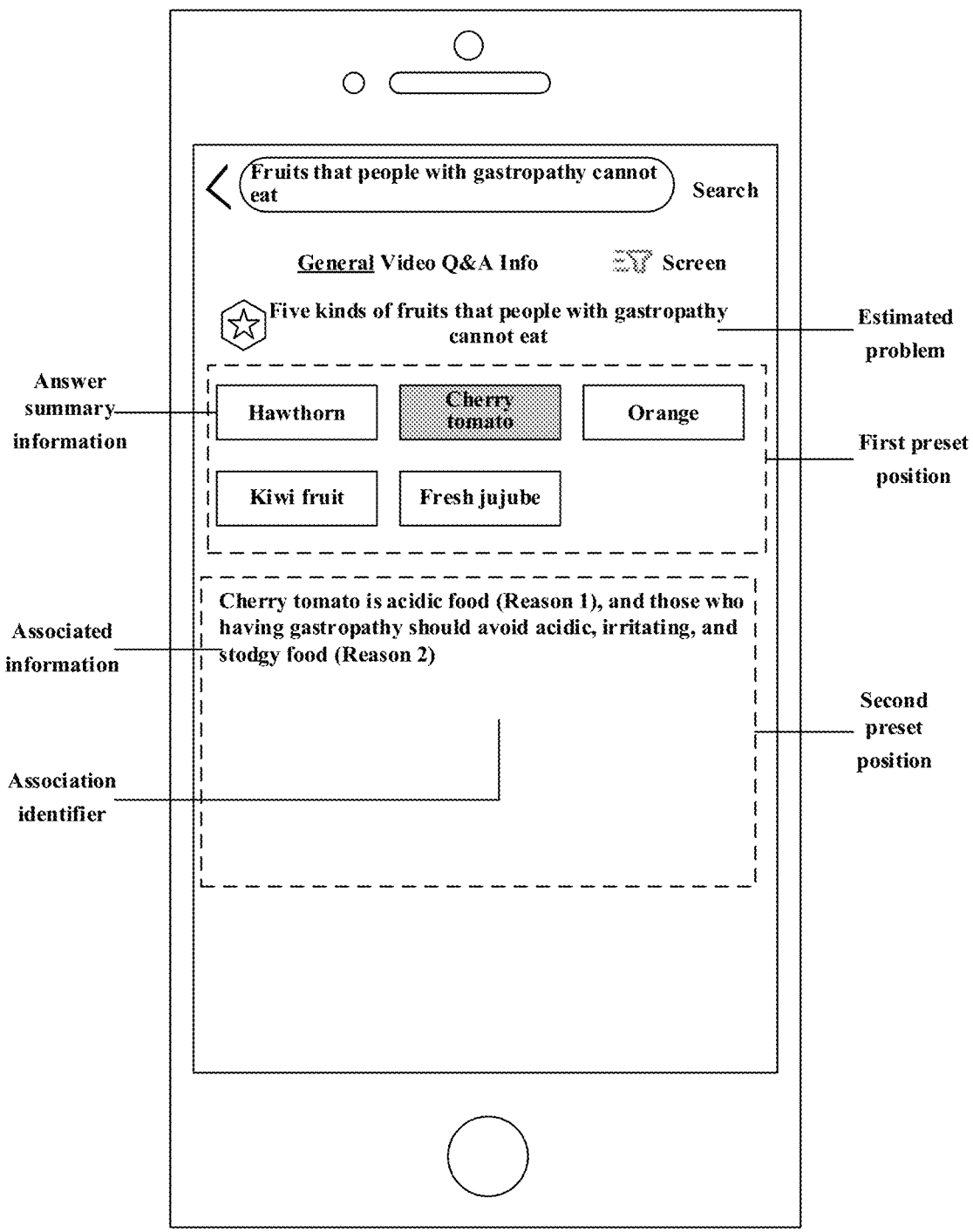
FIG. 2a shows a schematic diagram of a search result page of a manner I according to an embodiment of the present disclosure.

Several specific displaying manners for the respective sets of answer information are described below:

Manner I:

In a possible implementation, as shown in FIG. 2a, the answer summary information in the respective sets of answer information can be displayed at a first preset position of the search result page; in response to a selection operation on target answer summary information, associated information supporting the target answer summary information is displayed at a second preset position of the search result page, wherein the associated information includes an argument and/or a premise; an inner link is added in the associated information; the inner link points to the multimedia content corresponding to the target answer summary information; and in response to a triggering operation on target associated information, preview information of the multimedia content corresponding to the target answer summary information is displayed.

Specifically, the answer summary information can be displayed in sequence at the first preset position in a predetermined arrangement manner. The selection operation on the target answer summary information includes but is not limited to single click, double click, long press, dragging, sliding, and voice command. If any piece of answer summary information is "Pitaya", the voice command can be exemplarily a command generated in response to voice information "View pitaya" sent by the user.

In a possible implementation, the target answer summary information can be highlighted. Exemplarily, a background color of the target answer summary information can be deepened; the target answer summary information is displayed in red; and the font is bolded.

In a possible implementation, at the first entry into the search result page, default answer summary information can be highlighted at the first preset position, and associated information corresponding to the default answer summary information can be displayed at the second preset position.

The associated information supporting the target answer summary information can be part of the multimedia content, such as the first 10 seconds of a multimedia content in the genre of video, or a content extracted from the multimedia content, such as a brief description of a multimedia content in the genre of text. The genre of the associated information can include at least one of image, text, video, and audio.

The associated information includes the argument and/or the premise. In a possible implementation, types of the plurality of sets of answer information can be determined first, and a displayed content can be determined on the basis of a preset third correspondence relationship. The displayed content can be an argument, a premise, or an argument and a premise.

Specifically, a question type of the target question can include a scenario-first type and an answer-first type. The scenario-first type is used for representing different pieces of answer information corresponding to different scenarios, and the answer-first type is used for representing that the plurality of sets of answer information are less affected by scenarios. The types of the plurality of sets of answer information, the argument, and the premise can be determined by the server on the basis of a pre-trained content understanding mode after acquiring the plurality of sets of answer information.

The third correspondence relationship is a correspondence relationship between the types of the plurality of sets of answer information and the displayed content. Exemplary, if the types of plurality of sets of answer information are the scenario-first type, the displayed content can be the premise or the argument and the premise. If the types of the plurality of sets of answer information are the answer-first type, the displayed content can be the argument or the argument and the premise.

The inner link is added into the associated information. In a possible implementation, the inner link can be added to the associated information entirely or partially, or the inner link can be added to an association identifier corresponding to the associated information.

Exemplarily, as shown in FIG. 2a, if the associated information is a paragraph of text: "Cherry tomato is acidic food, and those who having gastropathy should avoid acidic, irritating, and stodgy food", the inner link can be added to the entire paragraph of text or to a target keyword in the associated information, such as "acidic food", or the inner link can be added to the association identifier corresponding to the associated information. For example, association identifiers "reason 1" and "reason 2" added with the inner link are respectively set behind "acidic food" and "stodgy food".

Figure 2B:
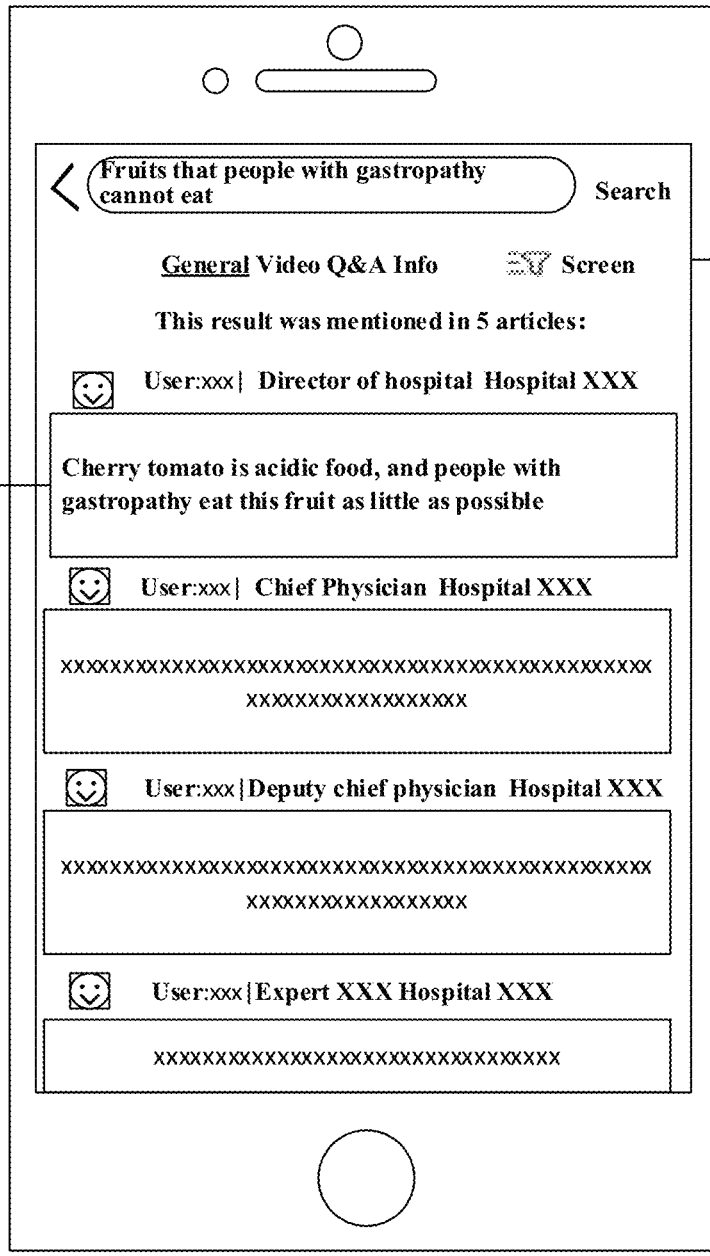
FIG. 2b shows a schematic diagram of a first page according to an embodiment of the present disclosure.

In a possible implementation, as shown in FIG. 2b, the inner link can point to the multimedia content corresponding to the answer summary information, such as multimedia content including the associated information or with the associated information extracted. Or, the inner link can also point to search results of the target keyword, corresponding to the inner link, in the associated information. Exemplarily, in response to a triggering operation on the target associated information, a search request can be initiated for the target keyword to acquire preview information of the search results corresponding to the target keyword.

In a possible implementation, when the preview information of the multimedia content corresponding to the target answer summary information is displayed, a first floating layer can be superimposed on the search result page, and the preview information of the multimedia content corresponding to the target answer summary information can be displayed on the first floating layer. Or, as shown in FIG. 2b, it is possible to jump to a first page, and the preview information of the multimedia content corresponding to the target answer summary information can be displayed on the first page.

In a possible implementation, in response to a triggering operation on the preview information of any multimedia content, it is possible to jump to an acquisition source of the preview information of the multimedia content, that is, search results of the preview information of the multimedia content are extracted.

In summary, exemplarily, as shown in FIG. 2a, the answer summary information is displayed in a predetermined format from left to right and from top to bottom in sequence at the first preset position. The target answer summary information "cherry tomato" is highlighted; the associated information "Cherry tomato is acidic food, and those who having gastropathy should avoid acidic, irritating, and stodgy food" supporting the target answer summary information "cherry tomato" is displayed at the second preset position; the association identifiers "reason 1" and "reason 2" added with the inner link are respectively set behind "acidic food" and "stodgy food"; in response to a triggering operation on "reason 1", as shown in FIG. 2b, it is possible to jump to the first page, and the preview information of the multimedia content with "acidic food" extracted is displayed.

Figure 3:
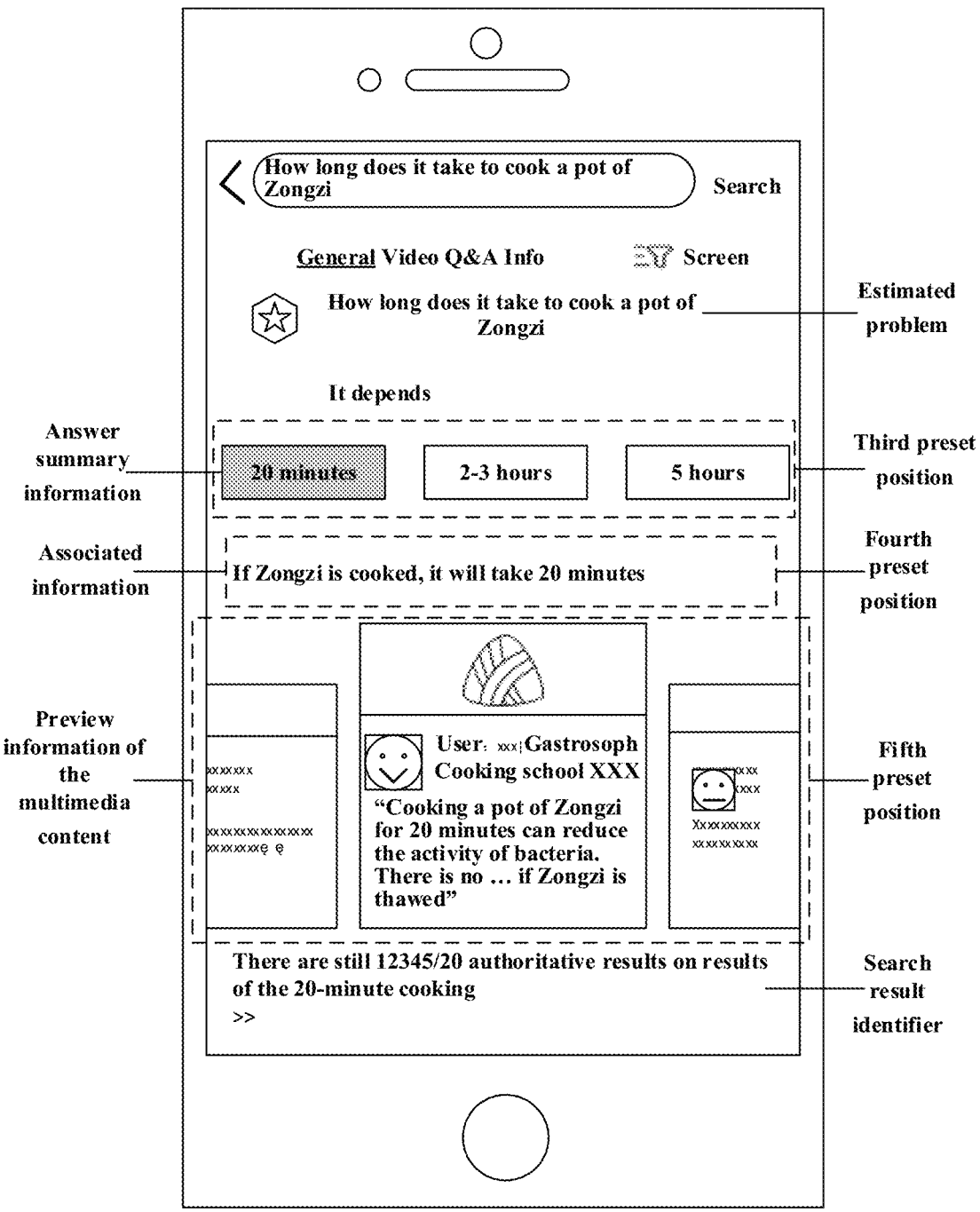
FIG. 3 shows a schematic diagram of a search result page of a manner II according to an embodiment of the present disclosure.

Way II:

In a possible implementation, as shown in FIG. 3, the answer summary information in the respective sets of answer information is displayed at a third preset position of the search result page; in response to a selection operation on target answer summary information, corresponding associated information supporting the target answer summary information is displayed at a fourth preset position, wherein the associated information includes an argument and/or a premise; and at least one multimedia card corresponding to the target answer summary information is displayed at a fifth preset position, wherein the multimedia card displays preview information of the multimedia content supporting the target answer summary information, and the preview information includes the target answer summary information, wherein the at least one multimedia card supports slide displaying.

The method for displaying the answer summary information at the third preset position, the method for displaying the associated information at the fourth preset position, and the method for determining the associated information are the same as manner I and will not be described in detail.

Specifically, the preview information of the multimedia content supporting the answer summary information can include one or more of image, video, text, and audio. The at least one multimedia card can support slide displaying, such as horizontal sliding and longitudinal sliding.

In a possible implementation, after sliding in either direction to the last multimedia card, if the user continues to slide, the multimedia cards can be displayed again from the first multimedia card.

In a possible implementation, a plurality of multimedia content cards corresponding to the target answer summary information are displayed at a fifth preset position, wherein the plurality of multimedia content cards correspond to multimedia contents coming from different sources and supporting the target answer summary information.

In another possible implementation, an arrangement order of the multimedia cards can be consistent with an arrangement order of the answer summary information corresponding to the multimedia cards. After a current multimedia card is slid to a next multimedia card, the target answer summary information will change from the answer summary information corresponding to the current multimedia card to the answer summary information corresponding to the next multimedia card, and a new target answer summary information is highlighted.

In a possible implementation, the plurality of multimedia content cards can be simultaneously displayed at the fifth preset position, and displaying styles of the multimedia cards at different positions can be set according to a preset displaying manner, such as shapes, sizes, and colors.

In a possible implementation, in response to a triggering operation on any multimedia content, it is possible to jump to an acquisition source of the preview information of the multimedia content displayed on the multimedia card, that is, search results of the preview information of the multimedia content are extracted.

In a possible implementation, in order to enable the users to quickly understand a relationship between the answer summary information and the preview information, the preview information includes the target answer summary information, and the target answer summary information in the preview information can be highlighted.

In a possible implementation, at the first entry into the search result page, default answer summary information can be highlighted at the third preset position of the search result page; associated information supporting the default answer summary information can be displayed at the fourth preset position; and multimedia cards corresponding to the default answer summary information can be displayed at the fifth preset position, and preview information of a multimedia content supporting the default answer summary information is displayed on the multimedia cards.

In summary, exemplarily, as shown in FIG. 3, the answer summary information "20 minutes", "2-3 hours", and "5 hours" are displayed side by side at the third preset position; if "20 minutes" is the target answer summary information, the associated information corresponding to the answer summary information is displayed at the fourth preset position below the third preset position; the associated information "If Zongzi is cooked, it will take 20 minutes" corresponding to the target answer summary information is displayed at the fourth preset position; the multimedia cards are displayed at the fifth preset position below the fourth preset position. Three multimedia cards supporting the target answer summary information are simultaneously displayed at the fifth preset position, and the multimedia card at the middle position is magnified. Each card shows preview information of image and text multimedia contents supporting the target abstract information. The target answer summary information "20 minutes" in the preview information is highlighted.

Figure 4:
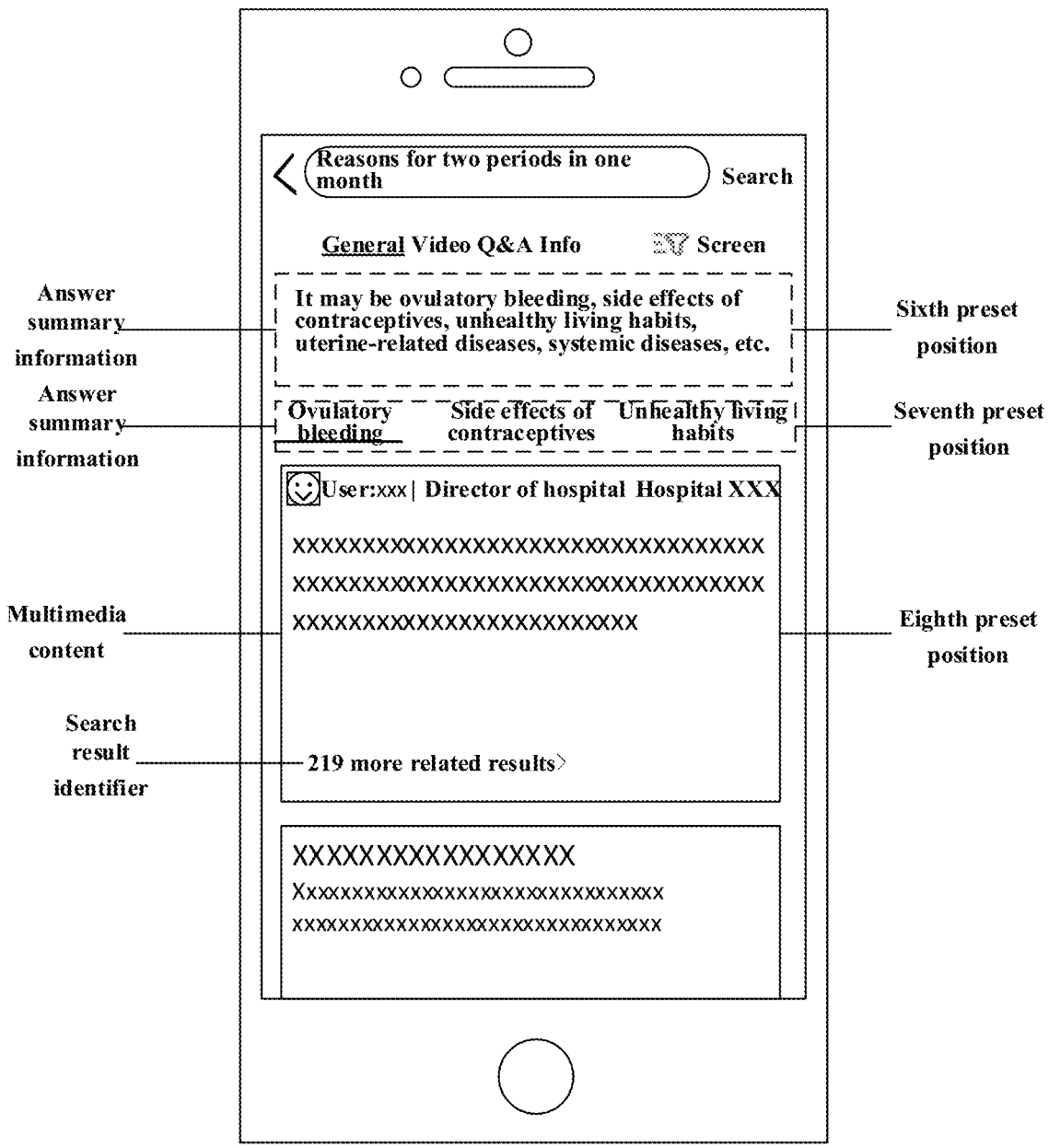
FIG. 4 shows a schematic diagram of a search result page of a manner III according to an embodiment of the present disclosure.

Way III:

In a possible implementation, as shown in FIG. 4, answer summary information including the respective pieces of answer summary information in the plurality of sets of answer information is displayed at a sixth preset position of the search result page; and the answer summary information in the respective sets of answer information is displayed at a seventh preset position of the search result page, and at least part of the multimedia content of the selected answer summary information is displayed at an eighth preset position, wherein the at least part of the multimedia content includes the selected answer summary information.

Specifically, the answer summary information is displayed to facilitate the user to quickly understand answers corresponding to the target question. Exemplarily, if the respective pieces of answer abstract answer are "lemon", "pear", and "watermelon", the answer summary information can be "Lemon, pear, and watermelon are beneficial for producing saliva, quenching the thirst, and dissipating heat". The method for displaying the answer summary information at the seventh preset position and the method for displaying at least part of the multimedia content at the eighth preset position are the same as manner I, and will not be described in detail here.

In a possible implementation, in order to enable the user to quickly understand a relationship between the selected answer summary information and the preview information, the at least part of the multimedia content can include the selected answer summary information, and the selected answer summary information can be highlighted.

In a possible implementation, at the first entry into the search result page, default answer summary information can be highlighted at the seventh preset position, and at least part of the multimedia content under the default answer summary information can be displayed at the eighth preset position.

In summary, exemplarily, as shown in FIG. 4, the answer summary information "It may be ovulatory bleeding, side effects of contraceptives, unhealthy living habits, uterine-related diseases, systemic diseases, etc." is displayed at the sixth preset position; the answer summary information "ovulatory bleeding", "side effects of contraceptives", "unhealthy living habits" is horizontally displayed at the seventh preset position; the selected answer summary information is "ovulatory bleeding"; and part of the multimedia content supporting "ovulatory bleeding" (including the name and position of an author of the multimedia content) is displayed at the eighth preset position.

Figure 5:
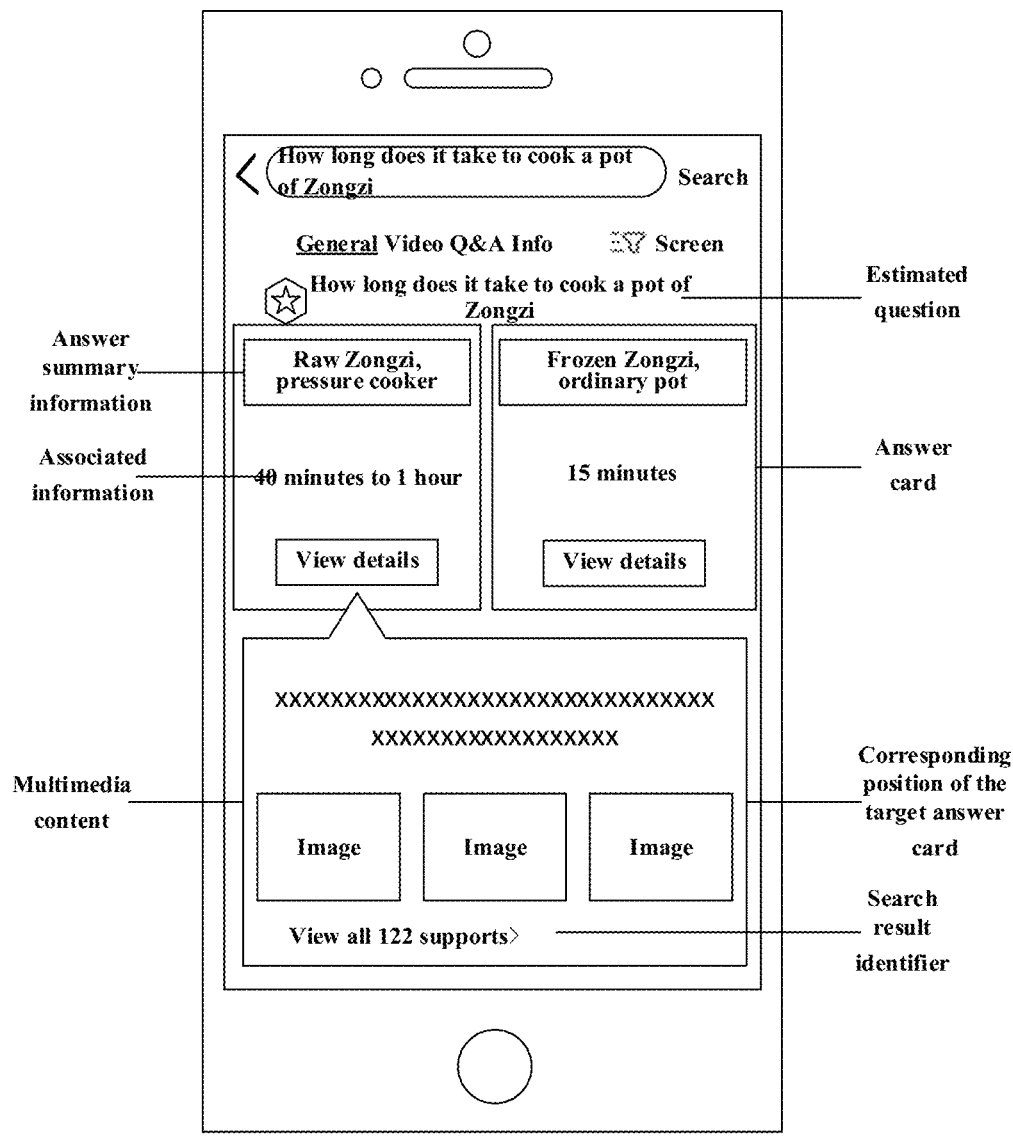
FIG. 5 shows a schematic diagram of a search result page of a manner IV according to an embodiment of the present disclosure.

Manner IV:

In a possible implementation, as shown in FIG. 5, answer cards respectively corresponding to the respective sets of answer information are displayed at the search result page, wherein the answer cards display the answer summary information in the answer information and associated information in the answer information, and the associated information includes an argument and/or a premise; and in response to a triggering operation on a target answer card, at least part of the multimedia content of the answer information corresponding to the target answer card is displayed at a corresponding position of the target answer card.

Specifically, the answer summary information and the associated information of the answer summary information in the answer cards are correspondingly displayed according to preset displaying positions, and the plurality of answer cards can be exemplarily arranged and displayed in any way from top to bottom, left to right, and the like. The method for determining the associated information is the same as manner I, and will not be described in detail here.

In a possible implementation, in response to a triggering operation on a target answer card, at least part of the multimedia content of the answer information corresponding to the target answer card is displayed at a corresponding position of the target answer card. The corresponding position can be exemplarily located below the target answer card. If other answer cards are displayed below the target answer card, after the at least part of the multimedia content is displayed, other answer cards can be moved down according to a height of the at least part of the multimedia content.

In another possible implementation, a target identifier corresponding to the answer cards can be displayed. In response to a triggering operation on the target identifier, at least part of the multimedia content of the answer information corresponding to the target answer card can be displayed at the corresponding position of the target answer card. The target identifier can be exemplarily "view details". The methods for displaying the target answer card and other answer cards are the same as the above method, and will not be described in detail here.

In a possible implementation, at the first entry into the search result page, the at least part of the multimedia content may not be displayed, or at least part of the multimedia content supporting the default answer summary information may be displayed.

In summary, exemplarily, as shown in FIG. 5, a first answer card and a second answer card are displayed horizontally. First answer summary information on the first answer card is "raw Zongzi, pressure cooker", and first associated information of the first answer summary information is "40 minutes to 1 hour", which is displayed below the first answer summary information. The second answer card is displayed in the same way. A first target identifier corresponding to the first answer card and a second target identifier corresponding to the second answer card are respectively displayed below the answer cards. In response to a triggering operation on the first target identifier, at least part of the multimedia content supporting the first answer summary information is displayed.

In a possible implementation, for manner I to manner IV, the target question can be displayed on the search result page, or as shown in FIG. 2a, FIG. 3, and FIG. 5, an estimated question corresponding to the target question can be displayed on the search result page.

Specifically, the target question can be input into a preset high-frequency question library for matching, and a high-frequency question with the highest similarity to the target question can be determined to be the estimated question and displayed on the search result page. The high-frequency question library stores high-frequency search records of user groups; or, estimated keywords in the target question can be identified, and are extracted and embedded into a preset sentence pattern.

Exemplarily, if the target question is "Which fruits that people with gastropathy cannot eat", and the estimated question corresponding to the target question can be "Three kinds of fruits that people with gastropathy cannot eat".

In a possible implementation, for manner I to manner IV, as shown in FIG. 3, FIG. 4, and FIG. 5, search result identifiers are displayed at corresponding positions of the respective pieces of answer summary information; and in response to a selection operation on the search result identifier corresponding to any piece of answer summary information, preview information of a plurality of search results corresponding to the selected answer summary information is displayed.

Specifically, the search result identifiers can be text identifiers or image identifiers, and the search result identifiers can reflect a quantity of a plurality of search results corresponding to the answer summary information, for example, "219 more related results". In response to a selection operation on the search result identifier corresponding to any piece of answer summary information, a second floating layer can be displayed on the search result page in an overlay manner, and preview information of the plurality of search results is displayed on the second floating layer; or, it is possible to jump to a second page, and preview information of the plurality of search results is displayed on the second page.

The search request processing method according to the embodiments of the present disclosure can include: in response to a search instruction, sending a search request including a target question; then, acquiring a plurality of sets of answer information corresponding to the target question; and finally, displaying the answer summary information in each set of answer information on a search result page, and displaying, when any piece of answer summary information is selected, at least part of the multimedia content supporting the selected answer summary information. By use of the method, a variety of pieces of different answer summary information extracted from the answer information can be displayed to a user, thereby intuitively displaying core contents of various answers to the user and displaying the preview information of the multimedia content corresponding to the answer summary information. This facilitates the user to quickly understand contents in search results and saves the search time of the user.

A person skilled in the art can understand that in the methods mentioned above of the specific implementations, the writing order of the respective step does not imply a strict execution order and imposes any restrictions on the implementation process. The specific execution order of the respective steps should be determined on the basis of functions and possible internal logics of the steps.

Based on the same inventive concept, the embodiments of the present disclosure further provide a search request processing apparatus corresponding to the search request processing method. Since the principle of the apparatus in the embodiments of the present disclosure for solving the problem is similar to the search request processing method described above in the embodiments of the present disclosure, the implementation of the apparatus can refer to the implementation of the method, and any repetition will be avoided.

Figure 6:
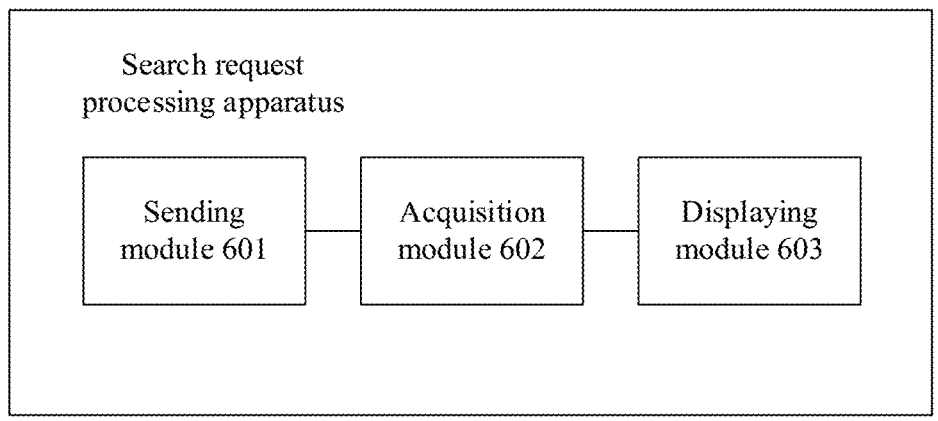
FIG. 6 shows a schematic diagram of an architecture of a search request processing apparatus according to an embodiment of the present disclosure.

FIG. 6 shows a schematic diagram of an architecture of a search request processing apparatus according to an embodiment of the present disclosure. The apparatus includes a sending module 601, an acquisition module 602, and a displaying module 603.

The sending module 601 is configured to: in response to a search instruction, send a search request including a target question;
 the acquisition module 602 is configured to acquire a plurality of sets of answer information corresponding to the target question, wherein each set of answer information includes answer summary information and a multimedia content supporting the answer summary information; a genre of the multimedia content is determined on the basis of a category of the target question, and the answer summary information is extracted on the basis of the multimedia content; and
 a displaying module 603 is configured to: display the answer summary information in each set of answer information on a search result page, and display, when any piece of answer summary information is selected, at least part of the multimedia content supporting the selected answer summary information.

In a possible implementation, the category of the target question is determined through a sentence pattern of the target question or a pre-trained category determining model.

In a possible implementation, when displaying the answer summary information in each set of answer information on a search result page, and displaying, when any piece of answer summary information is selected, at least part of the multimedia content supporting the selected answer summary information, the displaying module 603 is configured to:
 display the answer summary information in the respective sets of answer information at a first preset position of the search result page;
 in response to a selection operation on target answer summary information, display associated information supporting the target answer summary information at a second preset position of the search result page, wherein the associated information includes an argument and/or a premise; an inner link is added in the associated information; the inner link points to the multimedia content corresponding to the target answer summary information; and
 in response to a triggering operation on target associated information, display preview information of the multimedia content corresponding to the target answer summary information.

In a possible implementation, when displaying the answer summary information in each set of answer information on a search result page, and displaying, when any piece of answer summary information is selected, at least part of the multimedia content supporting the selected answer summary information, the displaying module 603 is configured to:
 display the answer summary information in the respective sets of answer information at a third preset position of the search result page;
 in response to a selection operation on target answer summary information, display corresponding associated information supporting the target answer summary information at a fourth preset position, wherein the associated information includes an argument and/or a premise; and
 display at least one multimedia card corresponding to the target answer summary information at a fifth preset position, wherein the multimedia card displays preview information of the multimedia content supporting the target answer summary information, and the preview information includes the target answer summary information,
 wherein the at least one multimedia card supports slide displaying.

In a possible implementation, when displaying the answer summary information in each set of answer information on a search result page, and displaying, when any piece of answer summary information is selected, at least part of the multimedia content supporting the selected answer summary information, the displaying module 603 is configured to:
 display, at a sixth preset position of the search result page, answer summary information including the respective pieces of answer summary information in the plurality of sets of answer information; and
 display the answer summary information in the respective sets of answer information at a seventh preset position of the search result page, and display at least part of the multimedia content of the selected answer summary information at an eighth preset position, wherein the at least part of the multimedia content includes the selected answer summary information.

In a possible implementation, when displaying the answer summary information in each set of answer information on a search result page, and displaying, when any piece of answer summary information is selected, at least part of the multimedia content supporting the selected answer summary information, the displaying module 603 is configured to:
 display, at the search result page, answer cards respectively corresponding to the respective sets of answer information, wherein the answer cards display the answer summary information in the answer information and associated information in the answer information, and the associated information includes an argument and/or a premise; and
 in response to a triggering operation on a target answer card, display, at a corresponding position of the target answer card, at least part of the multimedia content of the answer information corresponding to the target answer card.

In a possible implementation, the genre of the multimedia content includes at least one of the following:
 image, text, video, and audio; and
 the genre of the multimedia content is determined on the basis of a correspondence relationship between the category of the question and the genre of the multimedia after the category of the target question is determined.

In a possible implementation, the displaying module 603 is further configured to:
 display search result identifiers at corresponding positions of the respective pieces of answer summary information; and
 in response to a selection operation on the search result identifier corresponding to any piece of answer summary information, display preview information of a plurality of search results corresponding to the selected answer summary information.

The descriptions of the processing flows of the respective modules in the apparatus and the descriptions of the interaction flows between the modules can refer to the relevant explanations in the above method embodiments, and will not be detailed here.

Figure 7:
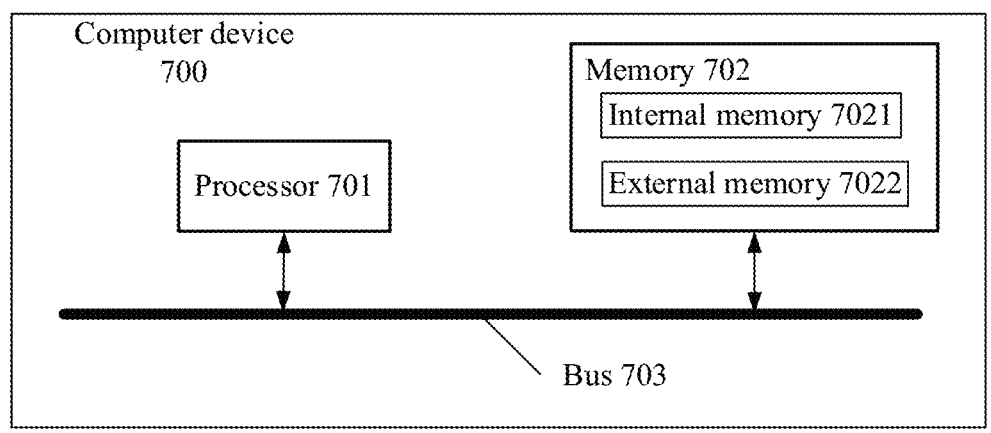
FIG. 7 is a schematic structural diagram of a computer device according to an embodiment of the present disclosure.

Based on the same technical concept, the embodiments of the present disclosure further provide a computer device. FIG. 7 shows a schematic structural diagram of a computer device 700 according to an embodiment of the present disclosure, including a processor 701, a memory 702, and a bus 703. The memory 702 is configured to store execution instructions, and includes an internal memory 7021 and an external memory 7022. The internal memory 7021, also referred to as an internal memory, is configured to temporarily store operational data in the processor 701 and data exchanged with the external memory 7022 such as a hard disk drive. The processor 701 exchanges data with the external memory 7022 through the internal memory 7021. When the computer device 700 runs, the processor 701 communicates with the memory 702 through the bus 703, causing the processor 701 to execute the following instructions:

in response to a search instruction, sending a search request including a target question;

acquiring a plurality of sets of answer information corresponding to the target question, wherein each set of answer information includes answer summary information and a multimedia content supporting the answer summary information; a genre of the multimedia content is determined on the basis of a category of the target question, and the answer summary information is extracted on the basis of the multimedia content; and displaying the answer summary information in each set of answer information on a search result page, and displaying, when any piece of answer summary information is selected, at least part of the multimedia content supporting the selected answer summary information.

In a possible implementation, in the instructions executed by the processor 701, the category of the target question is determined through a sentence pattern of the target question or a pre-trained category determining model.

In a possible implementation, in the instructions executed by the processor 701, the displaying the answer summary information in each set of answer information on a search result page, and displaying, when any piece of answer summary information is selected, at least part of the multimedia content supporting the selected answer summary information includes:

displaying the answer summary information in the respective sets of answer information at a first preset position of the search result page;

in response to a selection operation on target answer summary information, displaying associated information supporting the target answer summary information at a second preset position of the search result page, wherein the associated information includes an argument and/or a premise; an inner link is added in the associated information; the inner link points to the multimedia content corresponding to the target answer summary information; and in response to a triggering operation on target associated information, displaying preview information of the multimedia content corresponding to the target answer summary information.

In a possible implementation, in the instructions executed by the processor 701, the displaying the answer summary information in each set of answer information on a search result page, and displaying, when any piece of answer summary information is selected, at least part of the multimedia content supporting the selected answer summary information includes:

displaying the answer summary information in the respective sets of answer information at a third preset position of the search result page;

in response to a selection operation on target answer summary information, displaying corresponding associated information supporting the target answer summary information at a fourth preset position, wherein the associated information includes an argument and/or a premise; and displaying at least one multimedia card corresponding to the target answer summary information at a fifth preset position, wherein the multimedia card displays preview information of the multimedia content supporting the target answer summary information, and the preview information includes the target answer summary information, wherein the at least one multimedia card supports slide displaying.

In a possible implementation, in the instructions executed by the processor 701, the displaying the answer summary information in each set of answer information on a search result page, and displaying, when any piece of answer summary information is selected, at least part of the multimedia content supporting the selected answer summary information includes:

displaying, at a sixth preset position of the search result page, answer summary information including the respective pieces of answer summary information in the plurality of sets of answer information; and displaying the answer summary information in the respective sets of answer information at a seventh preset position of the search result page, and displaying at least part of the multimedia content of the selected answer summary information at an eighth preset position, wherein the at least part of the multimedia content includes the selected answer summary information.

In a possible implementation, in the instructions executed by the processor 701, the displaying the answer summary information in each set of answer information on a search result page, and displaying, when any piece of answer summary information is selected, at least part of the multimedia content supporting the selected answer summary information includes:

displaying, at the search result page, answer cards respectively corresponding to the respective sets of answer information, wherein the answer cards display the answer summary information in the answer information and associated information in the answer information, and the associated information includes an argument and/or a premise; and in response to a triggering operation on a target answer card, displaying, at a corresponding position of the target answer card, at least part of the multimedia content of the answer information corresponding to the target answer card.

In a possible implementation, in the instructions executed by the processor 701, the genre of the multimedia content includes at least one of the following:

image, text, video, and audio; and the genre of the multimedia content is determined on the basis of a correspondence relationship between the category of the question and the genre of the multimedia after the category of the target question is determined.

In a possible implementation, in the instructions executed by the processor 701, the method further includes:

displaying search result identifiers at corresponding positions of the respective pieces of answer summary information; and in response to a selection operation on the search result identifier corresponding to any piece of answer summary information, displaying preview information of a plurality of search results corresponding to the selected answer summary information.

The embodiments of the present disclosure further provide a computer-readable storage medium, wherein the computer-readable storage medium stores a computer program, and the computer program, when executed by a processor, performs the steps of the search request processing method in the method embodiments described above. The storage medium may be a volatile or a non-volatile computer-readable storage medium.

The embodiments of the present disclosure further provide a computer program product. The computer product carries program codes, and instructions included in the program codes can be used for executing the steps of the search request processing method in the method embodiments described above. Specific details can refer to the method embodiments described above, and will not be repeated here.

The embodiments of the present disclosure further provide a computer product. The computer product includes computer instructions. When the computer instructions are executed by a processor, the computer instructions implement the steps of the search request processing method in the method embodiments described above, specifically referring to the method embodiments described above, and will not be described in detail here.

The embodiments of the present disclosure further provide a computer program. When the computer program is executed by a processor, the computer program implements the steps of the search request processing method in the method embodiments described above, specifically referring to the method embodiments described above, and will not be described in detail here.

The aforementioned computer program product can be specifically implemented through hardware, software, or a combination of hardware and software. In an optional embodiment, the computer program product is specifically embodied as a computer storage medium, while in another optional embodiment, the computer program product is specifically embodied as a software product, such as a Software Development Kit (SDK).

A person skilled in the art can clearly understand that for the convenience and conciseness of the description, specific working processes of the system and apparatus described above can refer to the corresponding processes in the aforementioned method embodiments, and will not be described in detail here. In the several embodiments provided by the present disclosure, it should be understood that the disclosed system, apparatus, and method are achieved in other manners. The above-described apparatus embodiments are merely illustrative. For example, the division of the units is only one type of logical functional division, and other divisions is achieved in practice. For another example, multiple units or components can be combined or integrated into another system, or some features can be omitted, or not executed. In addition, the shown or discussed mutual coupling or direct coupling or communication connection is an indirect coupling or communication connection through some communication interfaces, apparatuses or units, and is in an electrical, mechanical or another form.

The units described as separate parts may or may not be physically separated, and parts displayed as units may or may not be physical units, that is, may be located in one position, or may be distributed on multiple network units. Some or all of the units are selected according to actual needs to achieve the objective of the solution of this embodiment.

In addition, the functional units in various embodiments of the present disclosure may be integrated in a single processing unit. The units may exist physically separately, or two or more units may be integrated in one unit.

When the functions are implemented in the form of software functional units and sold or used as independent products, the functions may be stored in a non-volatile computer-readable storage medium executable by a processor. Based on such an understanding, the technical solutions of the present disclosure essentially, or the part contributing to the prior art, or some of the technical solutions may be presented in the form of a software product. The computer software product is stored in a storage medium, and includes several instructions for instructing a computer device (which may be a personal computer, a server, a network device, or the like) to perform all or some of the steps of the methods of the various embodiments of the present disclosure. The aforementioned storage media include: various media that can store program codes, such as a USB flash drive, a mobile hard disk drive, a Read-Only Memory (ROM), a Random Access Memory (RAM), a magnetic disk, and an optical disc.

It should be finally noted that the above embodiments are only specific embodiments of the present disclosure and are intended to explain the technical solutions of the present disclosure, rather than limiting them. The protection scope of the present disclosure is not limited to this. Although detailed explanations have been made to the present disclosure by referring to the aforementioned embodiments, a person of ordinary skill in the art should understand that any person skilled in the art can still modify the technical solutions recorded in the aforementioned embodiments or easily think of changes within the scope disclosed by the present disclosure, or equivalently replace some of the technical features. These modifications, changes, or replacements do not separate the essences of the corresponding technical solutions from the spirit and scope of the embodiments of the present disclosure, and should fall within the protection scope of the present disclosure. Therefore, the protection scope of the present disclosure shall be subject to the claims.

The invention claimed is:

1. A search request processing method, comprising:

in response to a search instruction, sending a search request comprising a target question;

acquiring a plurality of answer information sets corresponding to the target question, wherein each answer information set comprises answer summary information and a multimedia content with a determined genre supporting the answer summary information; wherein the genre of the multimedia content is determined on the basis of a correspondence relationship between one category of the target question and a subset of a plurality of predetermined genres of the multimedia content after the category of the target question is determined, and the answer summary information is extracted from the multimedia content after the multimedia content is acquired, wherein extraction manners of the answer summary information are different for different genres of multimedia contents; and displaying the answer summary information in each answer information set on a search result page, and displaying at least part of the multimedia content supporting the selected answer summary information when any piece of answer summary information is selected, wherein the displaying the answer summary information in each set of answer information on a search result page, and displaying at least part of the multimedia content supporting the selected piece of answer summary information when any piece of answer summary information is selected comprises:

displaying the answer summary information in each answer information set at a first preset position of the search result page;

in response to a selection operation on the target answer summary information, displaying associated information supporting the target answer summary information at a second preset position of the search result page, wherein the associated information comprises an argument and/or a premise; an inner link is added in the associated information; and the inner link points to the multimedia content corresponding to the target answer summary information; and in response to a triggering operation on target associated information, displaying preview information of the multimedia content corresponding to the target answer summary information.

2. The method according to claim 1, wherein the category of the target question is determined through a sentence pattern of the target question or a pre-trained category determining model.

3. The method according to claim 1, wherein displaying the answer summary information in each answer information set on a search result page, and displaying at least part of the multimedia content supporting the selected piece of answer summary information when any piece of answer summary information is selected comprises:

displaying the answer summary information in each answer information set at a third preset position of the search result page;

in response to a selection operation on the target answer summary information, displaying corresponding associated information supporting the target answer summary information at a fourth preset position, wherein the associated information comprises an argument and/or a premise; and displaying at least one multimedia card corresponding to the target answer summary information at a fifth preset position, the multimedia card displaying preview information of the multimedia content supporting the target answer summary information, and the preview information comprising the target answer summary information, wherein the at least one multimedia card supports slide displaying.

4. The method according to claim 1, wherein displaying the answer summary information in each answer information set on a search result page, and displaying at least part of the multimedia content supporting the selected piece of answer summary information when any piece of answer summary information is selected comprises:

displaying, at a sixth preset position of the search result page, answer aggregation information comprising the respective pieces of answer summary information in the plurality of answer information sets; and displaying the answer summary information in each answer information set at a seventh preset position of the search result page, and displaying at least part of the multimedia content of the selected answer summary information at an eighth preset position, wherein the at least part of the multimedia content comprises the selected answer summary information.

5. The method according to claim 1, wherein displaying the answer summary information in each answer information set on a search result page, and displaying at least part of the multimedia content supporting the selected piece of answer summary information when any piece of answer summary information is selected comprises:

displaying, at the search result page, an answer card corresponding to each answer information set, the answer card displaying the answer summary information in the answer information and associated information in the answer information, and the associated information comprising an argument and/or a premise; and in response to a triggering operation on a target answer card, displaying, at a corresponding position of the target answer card, at least part of the multimedia content of the answer information corresponding to the target answer card.

6. The method according to claim 1, wherein the genre of the multimedia content comprises at least two of:
image, text, video, and audio.

7. The method according to claim 1, wherein the method further comprises:

displaying search result identifier at corresponding position of each piece of answer summary information; and in response to a selection operation on the search result identifier corresponding to any piece of answer summary information, displaying preview information of a plurality of search results corresponding to the selected answer summary information.

8. A computer device, wherein the computer device comprises a processor, a memory, and a bus, wherein the memory stores machine-readable instructions executable by the processor; when the computer device is run, the processor communicates with the memory through the bus; and the machine-readable instructions, when executed by the processor, cause the computer device to:

in response to a search instruction, send a search request comprising a target question;

acquire a plurality of answer information sets corresponding to the target question, wherein each answer information set comprises answer summary information and a multimedia content with a determined genre supporting the answer summary information; wherein the genre of the multimedia content is determined on the basis of a correspondence relationship between a category of the target question and a subset of the plurality of preset genres of the multimedia content after the category of the target question is determined, and the answer summary information is extracted from the multimedia content after the multimedia content is acquired, wherein extraction manners of the answer summary information are different for different genres of multimedia contents; and display the answer summary information in each answer information set on a search result page, and display at least part of the multimedia content supporting the selected answer summary information when any piece of answer summary information is selected, wherein the instructions to cause the computer device to display the answer summary information in each answer information set on a search result page, and display at least part of the multimedia content supporting the selected piece of answer summary information when any piece of answer summary information is selected comprise instructions to cause the computer device to:

display the answer summary information in each answer information set at a first preset position of the search result page;

in response to a selection operation on the target answer summary information, display associated information supporting the target answer summary information at a second preset position of the search result page, wherein the associated information comprises an argument and/or a premise; an inner link is added in the associated information; and the inner link points to the multimedia content corresponding to the target answer summary information; and in response to a triggering operation on target associated information, display preview information of the multimedia content corresponding to the target answer summary information.

9. The computer device according to claim 8, wherein the category of the target question is determined through a sentence pattern of the target question or a pre-trained category determining model.

10. The computer device according to claim 8, wherein the instructions to cause the computer device to display the answer summary information in each answer information set on a search result page, and display at least part of the multimedia content supporting the selected piece of answer summary information when any piece of answer summary information is selected comprise instructions to cause the computer device to:

display the answer summary information in each answer information set at a third preset position of the search result page;

in response to a selection operation on the target answer summary information, displaying corresponding associated information supporting the target answer summary information at a fourth preset position, wherein the associated information comprises an argument and/or a premise; and display at least one multimedia card corresponding to the target answer summary information at a fifth preset position, the multimedia card displaying preview information of the multimedia content supporting the target answer summary information, and the preview information comprising the target answer summary information, wherein the at least one multimedia card supports slide displaying.

11. The computer device according to claim 8, wherein the instructions to cause the computer device to display the answer summary information in each answer information set on a search result page, and display at least part of the multimedia content supporting the selected piece of answer summary information when any piece of answer summary information is selected comprise instructions to cause the computer device to:

display, at a sixth preset position of the search result page, answer aggregation information comprising the respective pieces of answer summary information in the plurality of answer information sets; and display the answer summary information in each answer information set at a seventh preset position of the search result page, and display at least part of the multimedia content of the selected answer summary information at an eighth preset position, wherein the at least part of the multimedia content comprises the selected answer summary information.

12. The computer device according to claim 8, wherein the instructions to cause the computer device to display the answer summary information in each answer information set on a search result page, and display at least part of the multimedia content supporting the selected piece of answer summary information when any piece of answer summary information is selected comprises:

display, at the search result page, an answer card corresponding to each answer information set, the answer card displaying the answer summary information in the answer information and associated information in the answer information, and the associated information comprising an argument and/or a premise; and in response to a triggering operation on a target answer card, display, at a corresponding position of the target answer card, at least part of the multimedia content of the answer information corresponding to the target answer card.

13. The computer device according to claim 8, wherein the genre of the multimedia content comprises at least two of:

image, text, video, and audio.

14. The computer device according to claim 8, wherein the instructions further comprise instructions to cause the computer device to:

display search result identifier at corresponding position of each piece of answer summary information; and in response to a selection operation on the search result identifier corresponding to any piece of answer summary information, display preview information of a plurality of search results corresponding to the selected answer summary information.

15. A computer product stored on a computer-readable storage medium, comprising computer instructions, wherein the computer instructions, when being executed by a processor, cause the processor to:

in response to a search instruction, send a search request comprising a target question;

acquire a plurality of answer information sets corresponding to the target question, wherein each answer information set comprises answer summary information and a multimedia content with a determined genre supporting the answer summary information; wherein the genre of the multimedia content is determined on the basis of a correspondence relationship between one category of the target question and a subset of a plurality of predetermined genres of the multimedia content after the category of the target question is determined, and the answer summary information is extracted from the multimedia content after the multimedia content is acquired, wherein extraction manners of the answer summary information are different for different genres of multimedia contents; and display the answer summary information in each answer information set on a search result page, and display at least part of the multimedia content supporting the selected answer summary information when any piece of answer summary information is selected, wherein the instructions to cause the processor to display the answer summary information in each answer information set on a search result page, and display at least part of the multimedia content supporting the selected piece of answer summary information when any piece of answer summary information is selected comprise instructions to cause the processor to:
- display the answer summary information in each answer information set at a first preset position of the search result page;
- in response to a selection operation on the target answer summary information, display associated information supporting the target answer summary information at a second preset position of the search result page, wherein the associated information comprises an argument and/or a premise; an inner link is added in the associated information; and the inner link points to the multimedia content corresponding to the target answer summary information; and
- in response to a triggering operation on target associated information, display preview information of the multimedia content corresponding to the target answer summary information.

16. The computer product according to claim 15, wherein the category of the target question is determined through a sentence pattern of the target question or a pre-trained category determining model.

17. The computer product according to claim 15, wherein the instructions to cause the processor to display the answer summary information in each answer information set on a search result page, and display at least part of the multimedia content supporting the selected piece of answer summary information when any piece of answer summary information is selected comprise instructions to cause the processor to:
- display the answer summary information in each answer information set at a third preset position of the search result page;
- in response to a selection operation on the target answer summary information, displaying corresponding associated information supporting the target answer summary information at a fourth preset position, wherein the associated information comprises an argument and/or a premise; and
- display at least one multimedia card corresponding to the target answer summary information at a fifth preset position, the multimedia card displaying preview information of the multimedia content supporting the target answer summary information, and the preview information comprising the target answer summary information,
- wherein the at least one multimedia card supports slide displaying.

* * * * *